(12) United States Patent
Lussier et al.

(10) Patent No.: US 9,840,936 B2
(45) Date of Patent: Dec. 12, 2017

(54) CASE WITH BALLISTIC LINER

(75) Inventors: Darin S. Lussier, Berlin, CT (US);
Sreenivasa R. Voleti, Farmington, CT (US); Thomas J. Robertson, Jr., Glastonbury, CT (US); Christopher M. Quinn, Middletown, CT (US)

(73) Assignee: UNITED TECHNOLOGIES CORPORATION, Farmington, MI (US)

( * ) Notice: Subject to any disclaimer, the term of this patent is extended or adjusted under 35 U.S.C. 154(b) by 1343 days.

(21) Appl. No.: 13/397,772

(22) Filed: Feb. 16, 2012

(65) Prior Publication Data

US 2013/0216367 A1    Aug. 22, 2013

(51) Int. Cl.

| F01D 25/24 | (2006.01) |
| F01D 21/04 | (2006.01) |
| B29C 70/32 | (2006.01) |
| B29D 99/00 | (2010.01) |
| B29C 70/22 | (2006.01) |
| F02C 7/04 | (2006.01) |
| B29L 31/00 | (2006.01) |
| B29C 70/20 | (2006.01) |

(52) U.S. Cl.
CPC .......... *F01D 21/045* (2013.01); *B29C 70/226* (2013.01); *B29C 70/228* (2013.01); *B29C 70/32* (2013.01); *B29D 99/006* (2013.01); *B29C 70/202* (2013.01); *B29L 2031/7504* (2013.01); *F02C 7/04* (2013.01); *F05D 2300/603* (2013.01); *F05D 2300/6012* (2013.01)

(58) Field of Classification Search
CPC ........ F01D 21/045; F01D 21/04; F01D 11/08; F01D 11/12; F01D 11/122; F01D 11/125; F01D 11/127; B29C 70/228; B29C 70/222

See application file for complete search history.

(56) References Cited

U.S. PATENT DOCUMENTS

| 4,410,577 | A | 10/1983 | Palmer et al. |
| 4,748,064 | A | 5/1988 | Harpell et al. |
| 5,437,538 | A | 8/1995 | Mitchell |
| 5,724,670 | A | 3/1998 | Price |
| 5,809,805 | A | 9/1998 | Palmer et al. |
| 7,435,693 | B2 | 10/2008 | Tsotsis et al. |

(Continued)

FOREIGN PATENT DOCUMENTS

| CA | 2779411 | 5/2011 |
| EP | 1473132 | 3/2004 |

(Continued)

OTHER PUBLICATIONS

"Advantages of NCF Over Woven Fabric Products"; Published Jul. 23, 2011.*

(Continued)

*Primary Examiner* — Dwayne J White
*Assistant Examiner* — Justin Seabe
(74) *Attorney, Agent, or Firm* — Carlson, Gaskey & Olds, P.C.

(57) ABSTRACT

A case for a gas turbine engine includes a containment section with a plurality of unidirectional roving fiber layers and a plurality of non-crimp fabric layers. A method of manufacturing the case includes winding the plurality of unidirectional roving fiber layers around the plurality of non-crimp fabric layers.

14 Claims, 3 Drawing Sheets

(56) References Cited

U.S. PATENT DOCUMENTS

| | | | |
|---|---|---|---|
| 7,766,603 B2* | 8/2010 | Beckford | F01D 21/045 415/119 |
| 7,867,568 B2 | 1/2011 | Hillermeier et al. | |
| 7,905,972 B2 | 3/2011 | Xie et al. | |
| 2006/0093847 A1 | 5/2006 | Hornick et al. | |
| 2009/0098337 A1 | 4/2009 | Xie et al. | |
| 2009/0155044 A1* | 6/2009 | Xie | B29C 70/086 415/9 |
| 2009/0155065 A1* | 6/2009 | Xie | F01D 11/122 415/200 |
| 2010/0024179 A1 | 2/2010 | Xie et al. | |
| 2011/0138769 A1 | 6/2011 | Costa et al. | |

FOREIGN PATENT DOCUMENTS

| | | |
|---|---|---|
| EP | 1674671 | 6/2006 |
| JP | 2008082332 | 4/2008 |
| WO | 9530074 | 4/1994 |
| WO | 9961757 | 12/1999 |

OTHER PUBLICATIONS

International Preliminary Report on Patentabilbity for PCT Application No. PCT/US2013/026148 dated Aug. 28, 2014.
Supplementary European Search Report for European Patent Application No. 13749726 completed Nov. 9, 2015.
International Search Report and Written Opinion for International Application No. PCT/US2013/026148 completed on Jun. 24, 2013.
Singapore Search Report for Singapore Patent Application No. 11201404102P completed May 28, 2015.

* cited by examiner

CASE WITH BALLISTIC LINER

BACKGROUND

The present disclosure relates to gas turbine engines, and in particular, to a fan case for a gas turbine engine.

The fan section of a gas turbine engine includes an array of fan blades which project radially from a hub within a fan case. Although exceedingly unlikely, it is possible for a fan blade or a fragment thereof to separate from the hub and strike the fan case. The fan case operates to prevent any liberated material from radially exiting the engine. The demands of blade containment are balanced by the demands for low weight and high strength.

SUMMARY

A case for a gas turbine engine according to an exemplary aspect of the present disclosure includes a containment section with a plurality of unidirectional roving fiber layers and a plurality of non-crimp fabric layers.

A method of manufacturing a case for a gas turbine engine according to an exemplary aspect of the present disclosure includes winding a plurality of unidirectional roving fiber layers around a plurality of non-crimp fabric layers.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
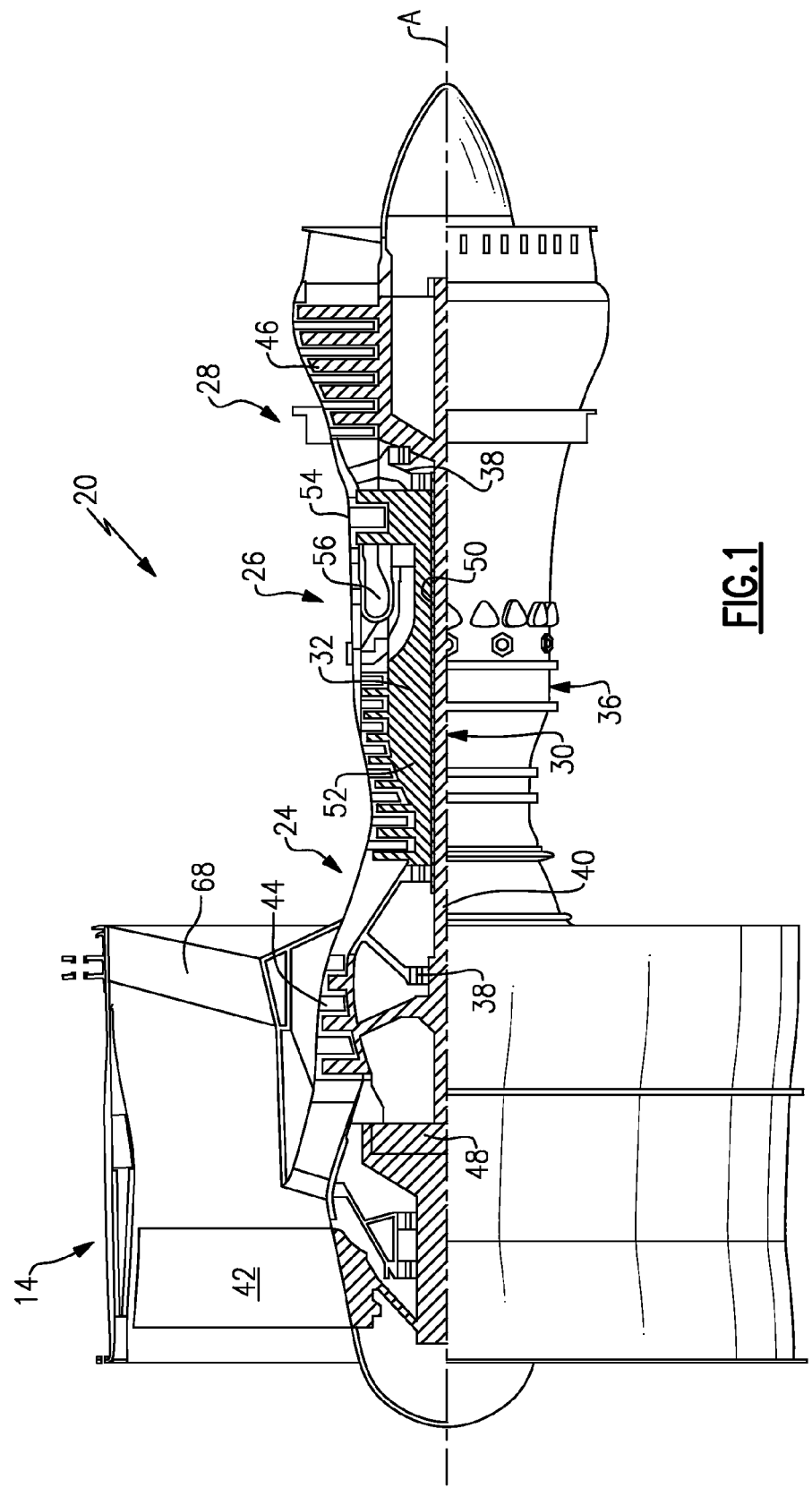
FIG. 1 is a schematic cross-sectional view of a gas turbine engine.

FIG. 1 schematically illustrates a gas turbine engine 20. The gas turbine engine 20 is disclosed herein as two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section. Although depicted as a two-spool, turbofan gas turbine engine in the disclosed non-limiting embodiment, it should be understood that the concepts described herein are not limited to use with two-spool or turbofan as the teachings can be applied to other turbine engine architectures or types.

The engine 20 generally includes a low speed spool 30 and a high speed spool 32 mounted for rotation about an engine central longitudinal axis A relative to an engine static structure 36 via several bearing systems 38. The low speed spool 30 generally includes an inner shaft 40 that interconnects a fan 42, a low pressure compressor 44 and a low pressure turbine 46. The inner shaft 40 may drive the fan 42 either directly or through a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed and burned with the fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
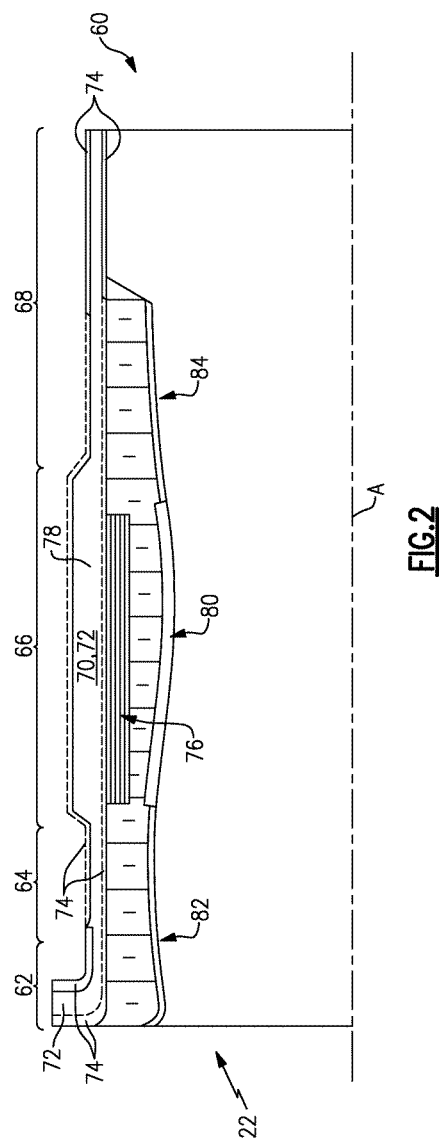
FIG. 2 is an enlarged cross-sectional view of a case of the gas turbine engine which provides blade containment according to one non-limiting embodiment.

With reference to FIG. 2, the fan section 22 includes a fan case 60 axially defined into a flange section 62, a forward shell section 64, a containment section 66, and an aft shell section 68 along axis A. It should be understood that alternative or additional sections may be defined. The fan case 60 combines a plurality of composite material forms in a plurality of circumferential layers to form a containment system that is lightweight and efficient. It should be understood that the particular fibers include but are not limited to carbon, fiberglass, aramid, etc. and the particular resins include but are not limited to Epoxy, BMI, Polyimides, etc.

Figure 3:
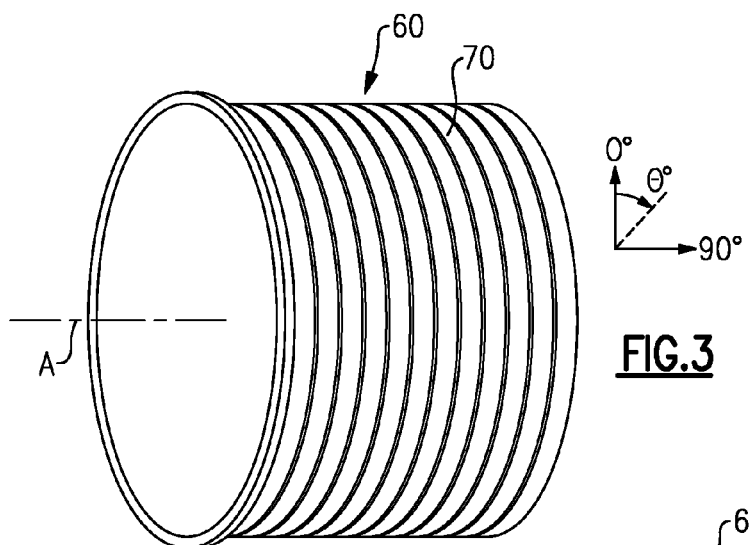
FIG. 3 is one layer of the case of the gas turbine engine to illustrate a unidirectional roving fiber layer arranged at 0 degree direction.
Figure 4:
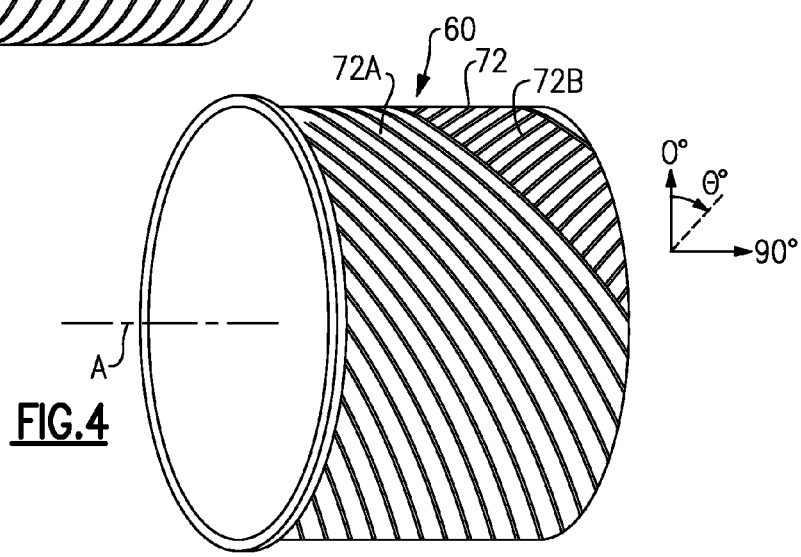
FIG. 4 is one layer of the case of the gas turbine engine to illustrate a non-crimp fabric layer.

The containment section 66 generally includes a plurality of unidirectional roving fiber layers 70 (one layer shown in FIG. 3) and a plurality of non-crimp fabric layers 72 (one layer shown in FIG. 4). Generally, each of the plurality of unidirectional roving fiber layers 70 is about half the thickness of each of the plurality of non-crimp fabric layers 72. In the disclosed non-limiting embodiment, each of the plurality of unidirectional roving fiber layers 70 includes three plies and each of the plurality of non-crimp fabric layers 72 includes two plies in the containment section 66.

The unidirectional roving fiber layers 70 may include a plurality of plies of tape or tows. As generally understood, a tow is a plurality of filaments and a tape is a collection of tows. Each ply within the unidirectional roving fiber layers 70 as defined herein are a collection of fiber tows oriented in the same direction. Typically these are wound around a mandrel and do not have stitching or weaves.

Figure 5:
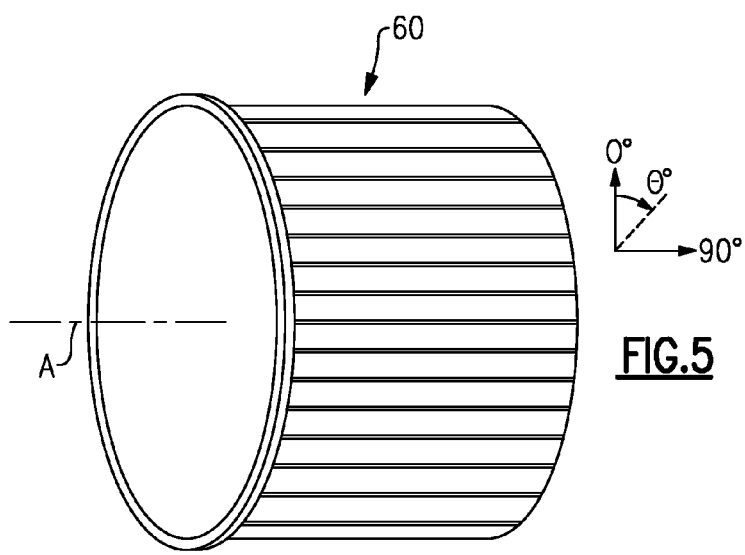
FIG. 5 is one layer of the case of the gas turbine engine to illustrate a unidirectional roving fiber layer arranged at 90 degree direction.

Each of the plurality of unidirectional roving fiber layers 70 are arranged at either a 0 degree or 90 degree direction with respect to the engine axis A. The 0 degree unidirectional roving fiber layers 70 are wound around the engine axis A to define a 0 degree direction to form a hoop around the engine axis A (FIG. 3). The 90 degree unidirectional roving fiber layers 70 are, for example, laid up by hand via standard alignment techniques. At least one of the plurality of unidirectional roving fiber layers 70 may also be oriented along the engine axis A to define a 90 degree direction (one layer shown in FIG. 5) to facilitate stiffness.

Each of the plurality of non-crimp fabric layers 72 includes two plies 72A, 72B (FIG. 4). A first ply 72A is arranged at a $+\theta$ orientation and the second ply 72B at a $-\theta$ orientation. $\theta$ is an angle defined herein to be between 0-80 degrees with respect to an engine longitudinal axis A and may most preferably be 45 degrees. As defined herein, non-crimp fabric may be reinforced mats of straight (non-crimped) fibers, to provide advantageous strength, ease of handling and low manufacturing costs.

Within the containment section 66, the plurality of unidirectional roving fiber layers define approximately 25% of a thickness while the plurality of non-crimp fabric layers define approximately 75% of the thickness. Within the forward shell section 64 and the aft shell section 68 the plurality of unidirectional roving fiber layers also define approximately 25% of a thickness while the plurality of non-crimp fabric layers define approximately 75% of the thickness but the shell sections 64, 68 are typically of a thinner thickness which in one example, is 0.25 inches (6.4 mm) thick while the containment section is 0.5 inches (12.7 mm) thick. It should be appreciate that this thickness is for but one disclosed non-limiting embodiment and that other case structures will benefit herefrom.

The fan case 60 may further include one or more fiberglass layers 74 which essentially encapsulates the plurality of unidirectional roving fiber layers 70 and the plurality of non-crimp fabric layers 72. The fiberglass layer 74 may be of various weights to facilitate final shaping of the fan case 60 such as in the flange section 62. That is, the fiberglass layer 74 protects the other layers therein as well as facilitates the final outer mold line definition through, for example, a machining operation.

The flange section 62 in accords with one non-limiting embodiment is formed entirely of non-crimp fabric layers 72 which may be encapsulate by the fiberglass layer 74. That is, no unidirectional roving fiber layers 70 are included in the flange section 62.

The containment section 66 also includes an inner ballistic liner 76 defined about the axis A. The inner ballistic liner 76 need only extend a relatively short axial length as the inner ballistic liner 76 is radially located directly outboard of the fan blades 42B of the fan 42 (FIG. 1). The inner ballistic liner 76 resists and dulls the ballistic threat which may be particularly acute with metallic fan blades and provides a light weight approach manufactured with composite materials to provide effective containment capability.

The inner ballistic liner 76 may be formed of a plurality of layers of a ballistic material such as a resin impregnated aramid fiber material. The inner ballistic liner 76 provides an inner cylindrical shell which is secondarily bonded or co-cured with the plurality of unidirectional roving fiber layers 70, the plurality of non-crimp fabric layers 72 and the inner fiberglass layer 74 which define a composite outer case structure 78 that replaces the heretofore relatively heavy metal alloy structure.

In addition, an abradable layer 80 radially inboard of the inner ballistic liner 76 provides close tolerances with tips of the fan blade 42B. Additional aerodynamic liners 82, 84 manufactured at least partially of a honeycomb, acoustic absorbant or other materials may be located axially forward and axially aft of the abradable liner 80. It should be appreciated that additional or alternative structures and or materials may be utilized with the outer case structure 78.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A case for a gas turbine engine comprising:
   a plurality of distinct case sections in axial series, the case sections including, in axial order, a flange section, a forward shell section, a containment section, and an aft shell section, the forward shell section, the containment section, and the aft shell section being formed of a plurality of unidirectional roving fiber layers and a plurality of non-crimp fabric layers, and the flange section being formed of a second plurality of non-crimp fabric layers, wherein the plurality of unidirectional roving fiber layers do not have stitching or weaves;
   a ballistic liner bonded to said containment section; and
   a fiberglass layer encapsulating the plurality of unidirectional roving fiber layers, the plurality of non-crimp fabric layers, and the second plurality of non-crimp fabric layers.

2. The case for a gas turbine engine as recited in claim 1, wherein at least one of said plurality of unidirectional roving fiber layers is at a 0 degree direction with respect to an engine axis.

3. The case for a gas turbine engine as recited in claim 1, wherein at least one of said plurality of unidirectional roving fiber layers is at a 90 degree direction with respect to an engine longitudinal axis.

4. The case for a gas turbine engine as recited in claim 1, wherein said plurality of unidirectional roving fiber layers define approximately 25% of a thickness of said containment section and said plurality of non-crimp fabric layers define approximately 75% of said thickness of said containment section.

5. The case for a gas turbine engine as recited in claim 4, wherein said containment section is approximately 0.25-1.0 inches thick.

6. The case for a gas turbine engine as recited in claim 4, wherein said plurality of unidirectional roving fiber layers define approximately 25% of a thickness of said forward shell section and said aft shell section and said plurality of non-crimp fabric layers define approximately 75% of said thickness of said forward shell section and said aft shell section.

7. The case for a gas turbine engine as recited in claim 6, wherein said forward shell section and said aft shell section is approximately 0.25 inches thick.

8. The case for a gas turbine engine as recited in claim 1, wherein said ballistic liner includes a plurality of woven aramid fibers impregnated with resin.

9. The case for a gas turbine engine as recited in claim 1, wherein each of said plurality of non-crimp fabric layers includes a first ply at a +θ orientation and a second ply at a −θ orientation relative to the engine longitudinal axis.

10. The case for a gas turbine engine as recited in claim 9, wherein +θ is between 0-80 degrees with respect to an engine longitudinal axis.

11. The case for a gas turbine engine as recited in claim 1, wherein the flange section excludes unidirectional roving fiber layers.

12. The case for a gas turbine engine as recited in claim 1, further comprising an abradable layer radially inboard of said ballistic liner.

13. The case for a gas turbine engine as recited in claim 12, further comprising aerodynamic liners located axially forward and axially aft of said abradable liner.

14. The case for a gas turbine engine as recited in claim 13, wherein said aerodynamic liners are formed of a honeycomb.

* * * * *